United States Patent
Garner et al.

(10) Patent No.: US 9,479,813 B2
(45) Date of Patent: *Oct. 25, 2016

(54) METHOD AND APPARATUS FOR AUTOMATIC SECOND SCREEN ENGAGEMENT

(71) Applicant: Roku, Inc., Saratoga, CA (US)

(72) Inventors: Greg Garner, Springdale, AR (US); Tomoko Shintani, Cupertino, CA (US)

(73) Assignee: ROKU, INC., Saratoga, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/923,061

(22) Filed: Oct. 26, 2015

(65) Prior Publication Data

US 2016/0044360 A1    Feb. 11, 2016

Related U.S. Application Data

(63) Continuation of application No. 14/582,113, filed on Dec. 23, 2014, now Pat. No. 9,185,446, which is a continuation of application No. 13/778,100, filed on Feb. 26, 2013, now Pat. No. 8,959,562.

(51) Int. Cl.
| | |
|---|---|
| *H04N 7/173* | (2011.01) |
| *H04N 21/41* | (2011.01) |
| *H04N 21/61* | (2011.01) |
| *H04N 21/436* | (2011.01) |
| *H04N 21/442* | (2011.01) |
| *H04N 21/4722* | (2011.01) |
| *H04N 5/445* | (2011.01) |
| *H04N 21/00* | (2011.01) |

(Continued)

(52) U.S. Cl.
CPC .......... *H04N 21/4122* (2013.01); *H04N 5/445* (2013.01); *H04N 21/00* (2013.01); *H04N 21/2541* (2013.01); *H04N 21/2543* (2013.01); *H04N 21/25825* (2013.01); *H04N 21/4126* (2013.01); *H04N 21/436* (2013.01); *H04N 21/44227* (2013.01); *H04N 21/4627* (2013.01); *H04N 21/4722* (2013.01); *H04N 21/6125* (2013.01); *H04N 21/6175* (2013.01); *H04N 21/25875* (2013.01); *H04N 21/25891* (2013.01); *H04N 21/4882* (2013.01)

(58) Field of Classification Search
USPC ........ 725/112, 113, 115, 116, 117, 133, 109, 725/108, 107, 105, 18, 33, 37, 38, 39, 40, 725/44, 50; 348/158, 376, 523, 552, 567, 348/716, 719, 838; 709/202, 203, 219
See application file for complete search history.

(56) References Cited

U.S. PATENT DOCUMENTS

| | | | |
|---|---|---|---|
| 7,987,484 B2 * | 7/2011 | Sloo ................... | H04N 5/44543 707/804 |
| 8,356,328 B2 * | 1/2013 | Minter ............... | H04N 7/17318 725/10 |

(Continued)

*Primary Examiner* — Jefferey Harold
*Assistant Examiner* — Mustafizur Rahman
(74) *Attorney, Agent, or Firm* — Sterne, Kessler, Goldstein & Fox P.L.L.C.

(57) ABSTRACT

A method includes displaying content on a television, detecting a personal display device in proximity of the television, detecting a selection of content displayed on the television, detecting an instruction associated with the selection, displaying, based on the instruction, information associated with the selection on the personal display device and displaying on the television an alert indicating that the information associated with the selection is on the personal display device.

21 Claims, 6 Drawing Sheets

(51) Int. Cl.
*H04N 21/258* (2011.01)
*H04N 21/254* (2011.01)
*H04N 21/2543* (2011.01)
*H04N 21/4627* (2011.01)
*H04N 21/488* (2011.01)

(56) References Cited

U.S. PATENT DOCUMENTS

| | | | | |
|---|---|---|---|---|
| 8,468,247 | B1* | 6/2013 | Richardson | H04L 67/18 370/329 |
| 8,732,309 | B1* | 5/2014 | Richardson | G06F 17/30893 709/223 |
| 8,862,633 | B2* | 10/2014 | Friedman | 707/803 |
| 9,015,163 | B1* | 4/2015 | Skolicki | G06F 17/30495 707/737 |
| 2002/0083455 | A1* | 6/2002 | Sato | H04N 5/44 725/58 |
| 2002/0151283 | A1* | 10/2002 | Pallakoff | G06F 3/14 455/575.1 |
| 2002/0196378 | A1* | 12/2002 | Slobodin | G06F 3/1415 348/744 |
| 2005/0172154 | A1* | 8/2005 | Short | H04H 60/23 726/5 |
| 2006/0195866 | A1* | 8/2006 | Thukral | G06Q 30/02 725/34 |
| 2007/0050812 | A1* | 3/2007 | Ebata | H04N 7/17318 725/40 |
| 2007/0124764 | A1* | 5/2007 | Morris | G06F 3/0482 725/37 |
| 2007/0136743 | A1* | 6/2007 | Hasek | G08B 25/085 725/33 |
| 2008/0282309 | A1* | 11/2008 | Kim | H04N 5/44543 725/117 |
| 2008/0320515 | A1* | 12/2008 | Sloo | H04N 5/44543 725/39 |
| 2009/0300641 | A1* | 12/2009 | Friedman | G06F 11/3664 718/104 |
| 2009/0307307 | A1* | 12/2009 | Igarashi | H04N 7/17309 709/203 |
| 2011/0030016 | A1* | 2/2011 | Pino, Jr. | H04L 12/2818 725/80 |
| 2011/0105094 | A1* | 5/2011 | Hassan | H04N 7/163 455/418 |
| 2011/0138416 | A1* | 6/2011 | Kang | G06F 3/0482 725/39 |
| 2011/0225610 | A1* | 9/2011 | Prieto | A63F 13/12 725/38 |
| 2012/0240158 | A1* | 9/2012 | Pan | H04N 21/2668 725/34 |
| 2012/0324505 | A1* | 12/2012 | Casagrande | H04N 5/04 725/32 |
| 2013/0173604 | A1* | 7/2013 | Li | G06F 17/30864 707/723 |
| 2013/0297922 | A1* | 11/2013 | Friedman | G06F 8/63 713/2 |
| 2014/0181855 | A1* | 6/2014 | Fife | H04N 21/25841 725/25 |

* cited by examiner

METHOD AND APPARATUS FOR AUTOMATIC SECOND SCREEN ENGAGEMENT

CROSS REFERENCE TO RELATED APPLICATIONS

This application is a continuation of U.S. patent application Ser. No. 14/582,113, filed on Dec. 23, 2014, which is a continuation of U.S. patent application Ser. No. 13/778,100, filed on Feb. 26, 2013 and issued as U.S. Pat. No. 8,959,562 on Feb. 17, 2015.

FIELD OF INVENTION

The invention generally relates to viewing content, and more particularly relates to viewing content through a second screen in a streaming environment.

BACKGROUND

Consumers have an increasing amount of on-demand media content available to them. For example, on-demand media content includes visual content (e.g., movies, television shows, still images), audio content (e.g., music), and software applications (e.g., games).

With an increasing amount of on-demand content available, it becomes more challenging for consumers to find, select and view content of interest.

SUMMARY

A method includes displaying content on a television, detecting a personal display device in proximity of the television, detecting a selection of content displayed on the television, detecting an instruction associated with the selection, displaying, based on the instruction, information associated with the selection on the personal display device and displaying on the television an alert indicating that the information associated with the selection is on the personal display device.

BRIEF DESCRIPTION OF THE DRAWINGS

The following figures depict various embodiments for illustrative purposes. From the figures and corresponding description, different embodiments may be employed without departing from the invention as described herein.

DETAILED DESCRIPTION

Figure 1:
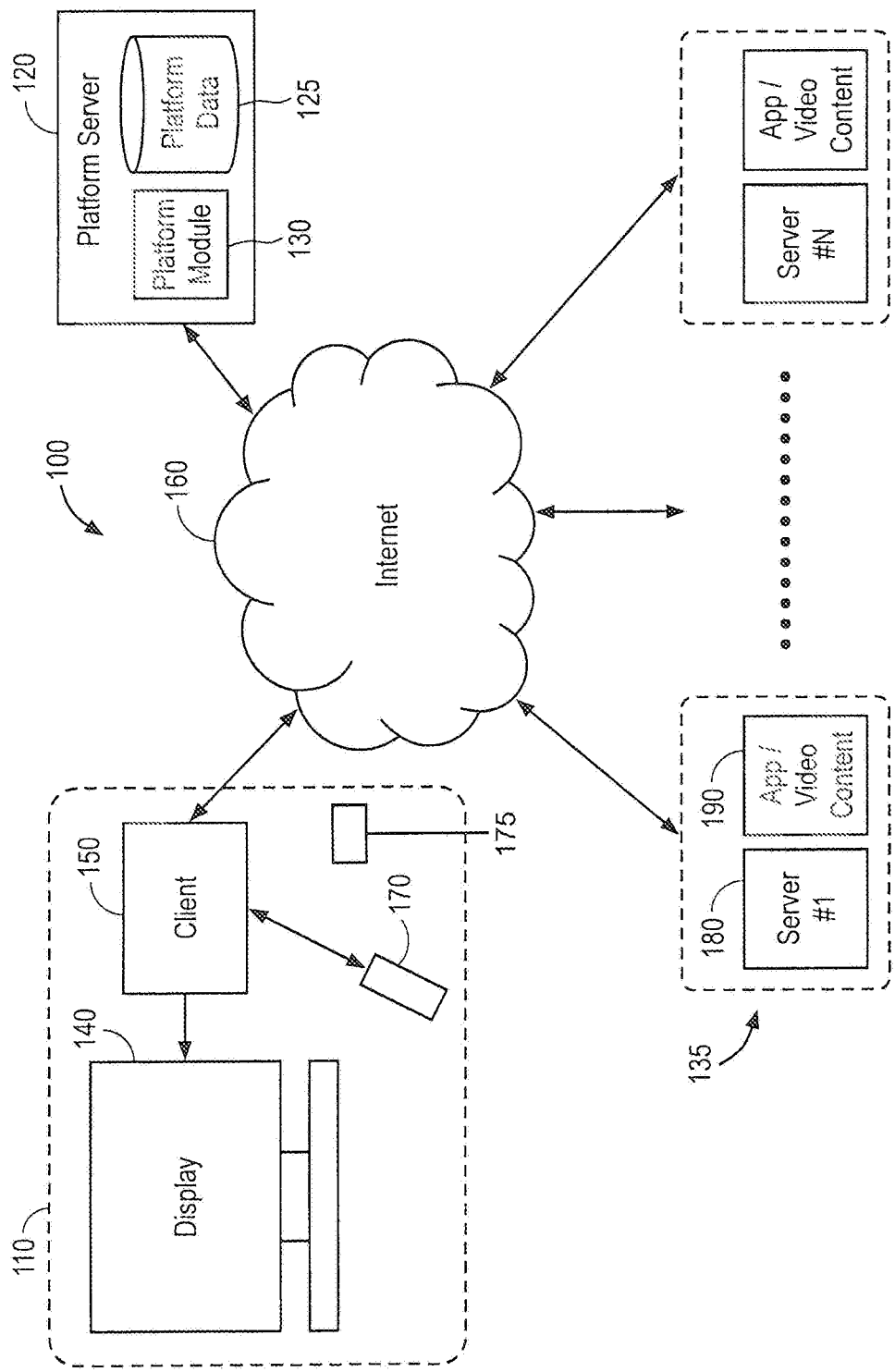
FIG. 1 illustrates a system configured in accordance with an embodiment of the invention.

FIG. 1 illustrates a streaming environment 100. The streaming environment 100 includes an interface system 110, a platform server 120 and one or more sources of content programming 135. In one embodiment, the interface system 110 includes a display device 140 (e.g., monitor or television), a client device 150 (e.g., a streaming media player), a user input device 170 (e.g., a remote control) and a personal display device 175. The client device 150 is configured to communicate with the display device 140, the personal display device 175 and a network 160.

In one embodiment, the platform server 120 includes a database 125 with platform data and a platform module 130. The database 125 is configured to store data such as programming software packages. The data within these programming software packages include the network locations and content descriptions of content sources 135, hardware/software capabilities of different firmware versions and specifications of the client device 150, customer data associated with each client device 150 and user interface information associated with the client device 150.

In one embodiment, the customer data includes customer specific information such as demographic data, geographic data, ISP identification and financial information. In one embodiment, the platform server 120 generates customized user interfaces for each of the client devices 150. In one embodiment, the user interface from the platform server 120 provides a selection of content such as audio, visual and gaming content to the client device 150. In this example, the platform server 120 is configured to supply a graphical representation of selectable content to the client device 150. The client device 150 selects and accesses individual content through this graphical representation.

In one embodiment, the platform server 120 is configured to receive input from client device 150 and processes the input through the platform module 130. The input from the client device 150 includes navigation and selection commands which may represent selection of content, search for content, and ongoing interaction with an application running on the platform server 120.

In one embodiment, the client device 150 displays content on display device 140. In one embodiment, the content displayed on the display device is sourced from one of the client device 150, the platform server 120 and the content source 135. In one embodiment, the input device 170 transmits signals to the client device 150. In embodiment, the input device 170 utilizes one of or a combination of an infrared signal, radio frequency signal and Bluetooth signal to communicate with the client device 150.

The input device 170 is configured to enter data and to make user selections from the interface as presented through the client device 150. In one embodiment, the interface shown through the client device 150 is based on the platform server 120, from the content sources 135 or locally from the client device 150. In one embodiment, the input device 170 also includes a display to show additional content. In another embodiment, the input device 170 includes a touch screen which allows content to be displayed and input to be received. Exemplary input devices 170 include remote controls, smart phones, tablets, and mobile computers.

The personal display device 175 is configured to display either through the client 150 or through the internet 160. In one embodiment, the personal display device includes smart phones, computers, tablets, and mobile computers. The personal display device 175 may be the input device 170. In one embodiment, the personal display device receives content from the client device 150, the internet 160 and the platform server 120 for display.

In one embodiment, the content sources 135 include a server 180 and a storage device 190. In one embodiment, the network address of particular content stored within the storage device 190 is maintained within the platform server 120. In another embodiment, the general location of the content source 135 is maintained and stored within the platform server 120 while the specific locations of corresponding content are managed locally by the content source 135. In yet another embodiment, the location of the content source 135 is embedded within the graphical representation displayed through the client device 150 such that interaction with the graphical representation through the client device 150 allows the content located within the content source 135 to be accessible to the client device 150.

In one embodiment, the content stored within the storage device 190 includes music, video, still pictures, text, graphics, gaming applications and the like. In one embodiment, the particular content which is stored within the storage device 190 is provided to the client device 150 through the network 160. In one embodiment, the network 160 is the Internet. In another embodiment, the network 160 is a local area network.

In one embodiment, the client device 150 makes a request for specific content. If the requested content is video content, the storage device 190 transmits video data that represents the specific video content to the client device 150 through the content source 135. In one embodiment, platform server 120 supports interfaces, such as login interfaces, search interfaces, and customized interfaces for the client device 150.

Figure 2:
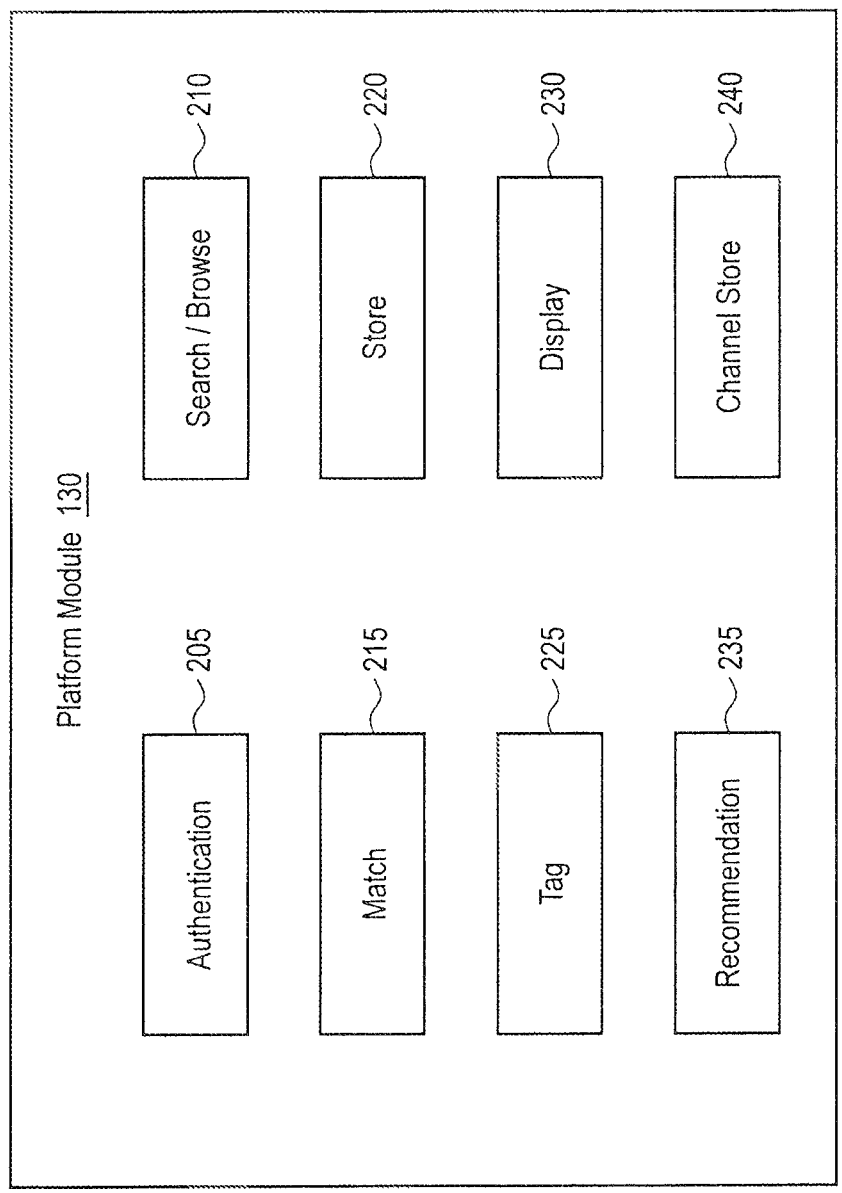
FIG. 2 illustrates server modules utilized in accordance with an embodiment of the invention.

FIG. 2 illustrates a representative platform module 130 as shown in FIG. 1. In one embodiment, the platform module 130 includes an authentication module 205, a search/browse module 210, a match module 215, a store module 220, a tag module 225, a display module 230, a recommendation module 235, and a channel store module 240.

The authentication module 205 interacts with the client device 150 and authenticates a profile or user account associated with the particular client device 150. For example, the profile includes data associated with a user such as the user name, password, device associations, IP addresses, location, email address, payment information and content subscriptions. In one embodiment, the authentication module 205 recognizes and authenticates the client device associated with a particular user account through password authentication, location authentication, visual authentication, or audio authentication. The authentication can be configured to occur when setting up a new client device 150, purchasing content or subscriptions, or periodically as needed.

The search/browse module 210 is configured to detect input from a client device 150 and/or the input device 170. In one embodiment, the input represents the selection of a channel, content or application. In another embodiment, the input represents a textual, visual or audible search for content, a channel or application. In yet another embodiment, the input represents browsing content, channels or applications.

The match module 215 coordinates searches and requests for content, channels and applications. For example, the match module 215 identifies relevant content, channels and applications based upon the search criteria. In one embodiment, the match module 215 relies on titles, tags, description and reviews associated with the content, channels and applications to determine relevance of the match.

The store module 220 coordinates the storage of data within the platform server 120. The data coordinated by the store module 220 includes content listings and corresponding descriptions, user profiles, searching and browsing requests, content viewed, channels and applications utilized, tags and friends. Depending on the nature of the data, access to the content is controlled to prevent unauthorized use.

The tag module 225 coordinates the creation and use of tags associated with content, channels and applications. Tags can be assigned to channels and applications by the author of the channels and applications or by users through the client device 150. Tags can also be assigned to portions of audio and video streams by the author of the audio and video streams or by users through the client device 150. The tags may describe the corresponding content or allow an opportunity for a user to provide commentary associated with the corresponding content. The tags can be used for personal use and searched by the user creating the tags or the tags can be aggregated among multiple users and searched through a public database by others.

The display module 230 coordinates display of representative content and user interfaces from the platform server 120 to each of the client devices 150. Examples of representative content include listings and descriptions of channels, content and applications. Further, the user interface is configured to allow searching and browsing for channels, contents and applications.

The recommendation module 235 is configured to process content recommendations based on a combination of current subscriptions, browsing or searching input and content source. Further, the recommendation module 235 also can utilize tags to provide recommendations. In another embodiment, the recommendation module 235 utilizes the availability of the content to provide a recommendation. For example, a viewing window may describe when the content is available for viewing, such as a beginning and end date to access the content. Further, the recommendation module 235 also can utilize the subscription data associated with each user account to determine whether the content is available to the user without additional charge because the account user is already subscribed to the content provider. Further, the recommendation module 235 can prioritize content that is available free of charge without any subscriptions. In another embodiment, the recommendation module 235 prioritizes content based on popularity ratings as derived from the public viewing data 335.

The channel store module 240 is configured to manage subscriptions of channels associated with each client device 150. Channels often contain content such as video content and audio content. In one embodiment, access to the content within a channel requires a subscription to that channel, but the subscription is free. In another embodiment, access to the content within a channel requires a paid subscription. In yet another embodiment, access to some content and applications require payment and a subscription. In one embodiment, the channel store module 240 manages the addition of channels, content and applications. Similarly, the channel store module 240 also manages deletion or modifications to channels, content and applications.

Figure 3:
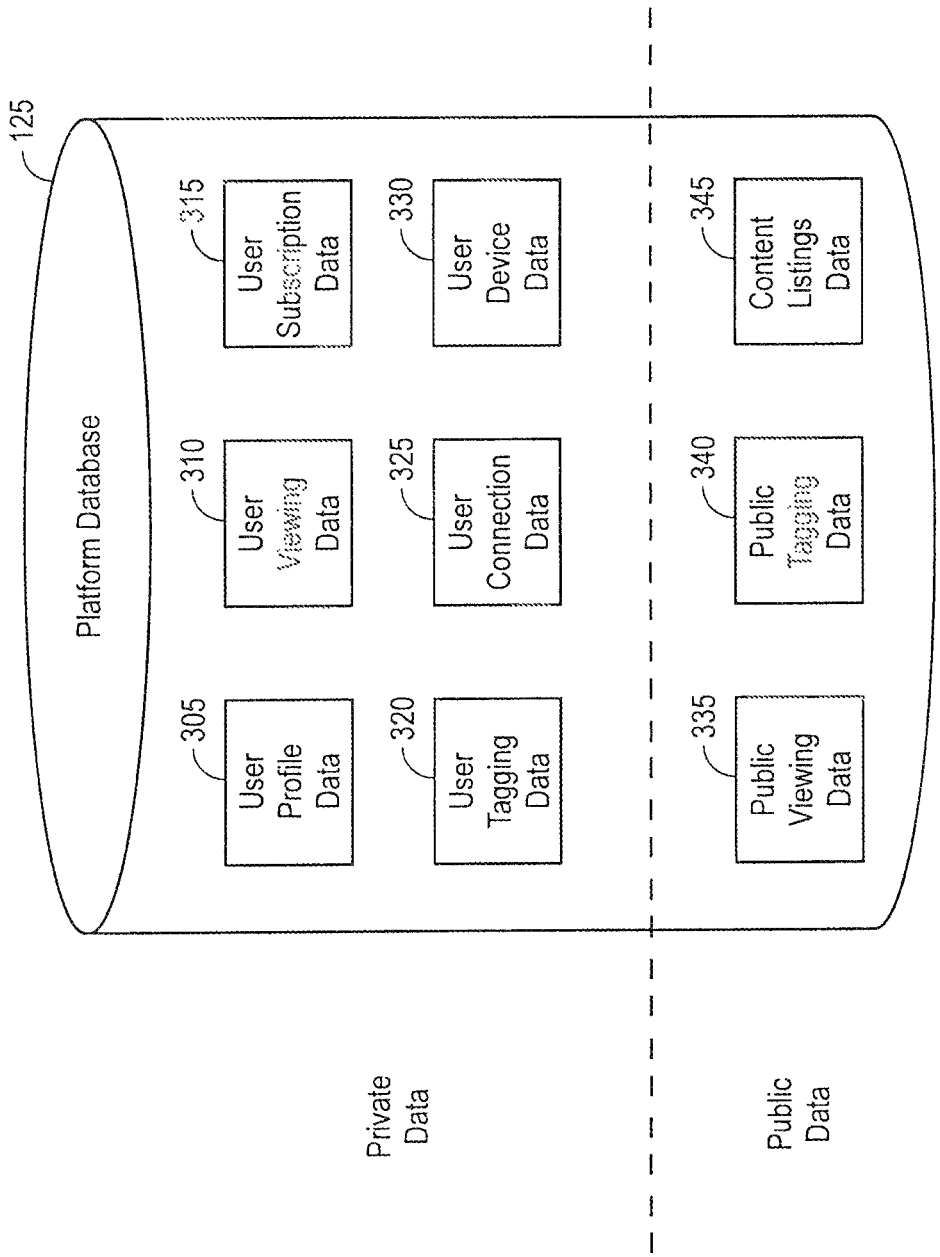
FIG. 3 illustrates server data utilized in accordance with an embodiment of the invention.

FIG. 3 illustrates a representative platform database 125. In one embodiment, the platform database 125 includes private data and public data. The private data contains information which is associated with a particular user; the public data contains information that is aggregated and not associated with a particular user. The private data within the platform database 125 includes user profile data 305, user viewing data 310, user subscription data 315, user tagging data 320, user connection data 325 and user device data 330. The public data within the platform database 125 includes public viewing data 335, public tagging data 340 and content listing data 345.

In one embodiment, utilization of the private data is restricted to access within the platform server 120 and access by a particular user to his or her private data. Utilization of the public data can be accessed by all users and selected third parties.

The user profile data 305 includes information such as a user's name, address, credit card/payment information, age and gender. The user viewing data 310 includes the channels, audio content, visual content, video content and applications utilized through a client device 150. In one embodiment, the user viewing data 310 allows a client device 150 that is associated with the particular user to view recently watched channels and content as well as determine which applications were recently used. Further, the user viewing data 310 also includes stored searches that are performed through devices associated with this user account. In one embodiment, the stored searches are initiated by explicitly searching for content through a text based, image based or voice based search. In another embodiment, the stored searches are implicitly identified by recording browsing choices.

The user subscription data 315 includes information such as channels subscribed by a particular user and content and applications purchased by the particular user. The user tagging data 320 includes tagging information related to a particular user. For example, the tagging information can include a user's comment or description of a channel, application or content. In one embodiment, the entire content is tagged with a description as determined by the particular user. In another embodiment, a portion of the content is tagged with a description of that portion of the content by the particular user. The user connection data 325 includes a listing of other users that are associated with the particular user as a friend. In one embodiment, having users connected to each other as friends allows a particular user to share recently watched content, channel subscriptions, user tags and applications with other connected users. The user device data 330 includes a listing of devices associated with the particular user. The device includes a client device 150, an input device 170, a mobile device such as a tablet, laptop computer, or smart phone.

The public viewing data 335 includes a listing of channels, content and applications utilized by many users in aggregate. In one embodiment, the popularity of the content is ranked based on the number of viewers and the order in which the content is viewed. For example, the higher number of views per day for content would indicate higher popularity. Further, when multiple content options are presented next to each other, the content which is selected first for viewing is given a higher popularity rating.

The public tagging data 340 includes tags that are utilized to describe channels, content and applications from many users in aggregate. In one embodiment, the tagging data within the public tagging data 340 comes from content providers. For example, a movie studio responsible for producing a movie could provide tagging data to the public tagging data 340 that describes portions of the movie. The public tagging data also includes closed captioning and subtitles associated with respective segments of the content.

The content listings data 345 includes listings of content and descriptions of the corresponding content. In one embodiment, the descriptions include key word tagging throughout the content, a summary description of the content, directors and actors associated with the content and third party reviews associated with the content.

Figure 4:
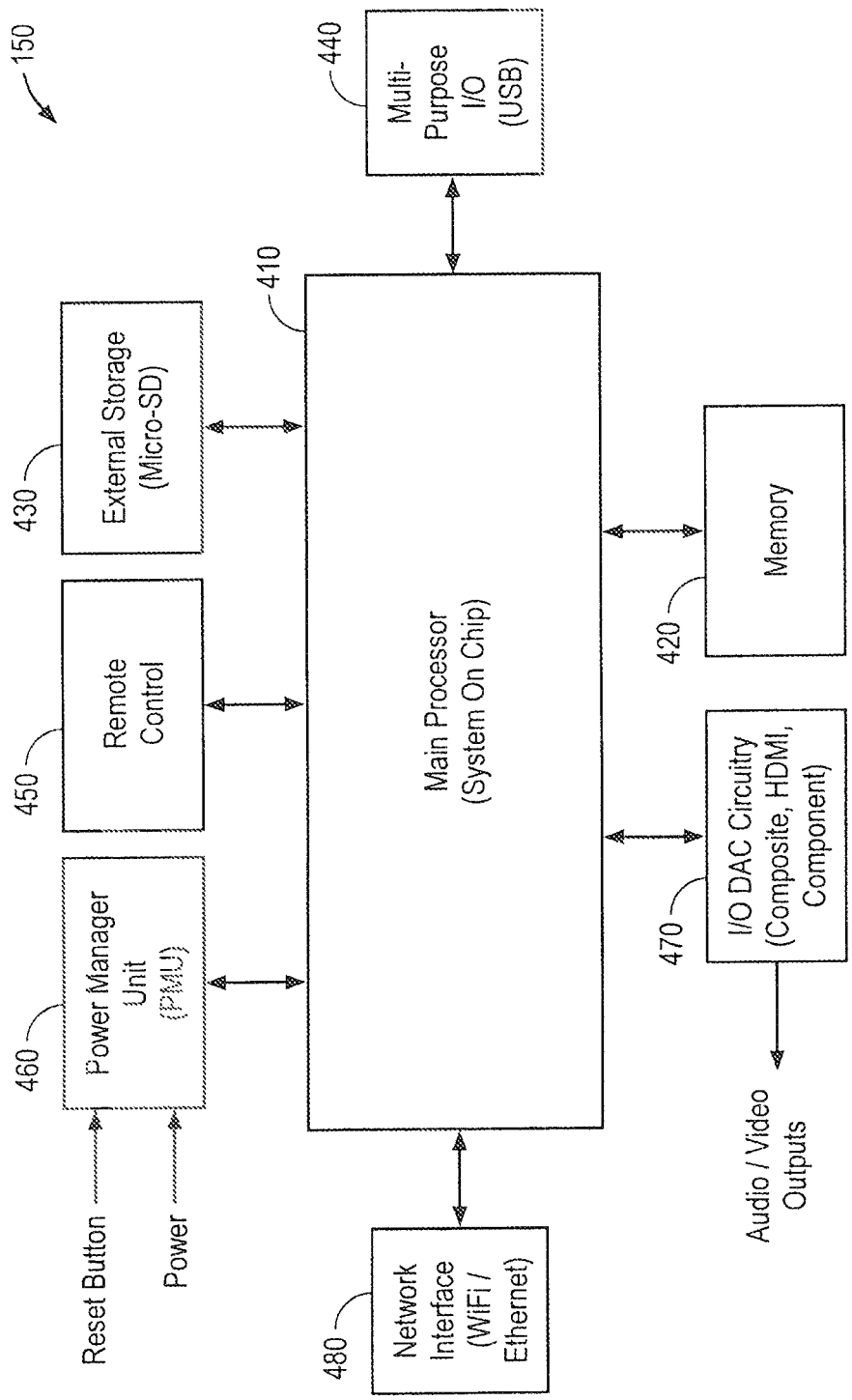
FIG. 4 illustrates a streaming media client device configured in accordance with an embodiment of the invention.

FIG. 4 illustrates a block diagram of a representative client device 150. In one embodiment, the client device 150 is configured to receive streamed content. The content streamed into the client device 150 includes audio content, visual content and applications. In one embodiment, the client device 150 is utilized to transmit instructions and selections to the content server 135 and/or the platform server 120.

In one embodiment, the client device includes a processor 410, internal memory 420, external storage 430, multipurpose I/O port 440, input device interface 450, power management 460, audio/visual I/O interface 470 and network interface 480.

In one embodiment, the processor 410 utilizes a central processing unit (CPU). In another embodiment, the processor 410 also utilizes a graphics processing unit (GPU) which may be integrated with the CPU or be configured to be physically separate. In one embodiment, the internal memory 420 includes one of or a combination of random access memory (RAM), flash memory, and read only memory (ROM). Additional memory and memory interfaces such as the multi-purpose I/O port 440 may be provided in various embodiments, to support memories such as the external storage 430 which can include hard disks, USB drives, SD cards, and the like. These memories may also be used for storage of applications, programs, buffered media, media, executable computer code and software keys.

In one embodiment, the input device interface 450 enables an input device to interface with the client device 150. In one embodiment, the input device interface 450 is configured to communicate with the input device through a wireless interface such as Bluetooth (BT), radio frequency (RF), and infrared (IR). In one embodiment, the input device interface 450 supports the functionality through an input device including any combination of virtual buttons embodied on a customization screen, physical buttons, accelerometer, gyroscope, pressure sensor, tilt sensor, magnetic sensor, microphone, and light sensor.

In one embodiment, the I/O interface 470 supports multiple video output options such as High Definition Multimedia Interface (HDMI), Red-Green-Blue (RGB) component video, Separate Video (S-video), Digital Visual Interface (DVI), Video Graphics Array (VGA), Mobile High-Definition Link (MHL) and composite video. In one embodiment, USB and Apple® Thunderbolt® enabled displays are also supported.

In one embodiment, the network interface 480 supports multiple network interfaces such as Ethernet, Wi-Fi and Bluetooth. In another embodiment, the network interface 480 also supports coaxial, digital TV antenna, and satellite television.

Figure 5:
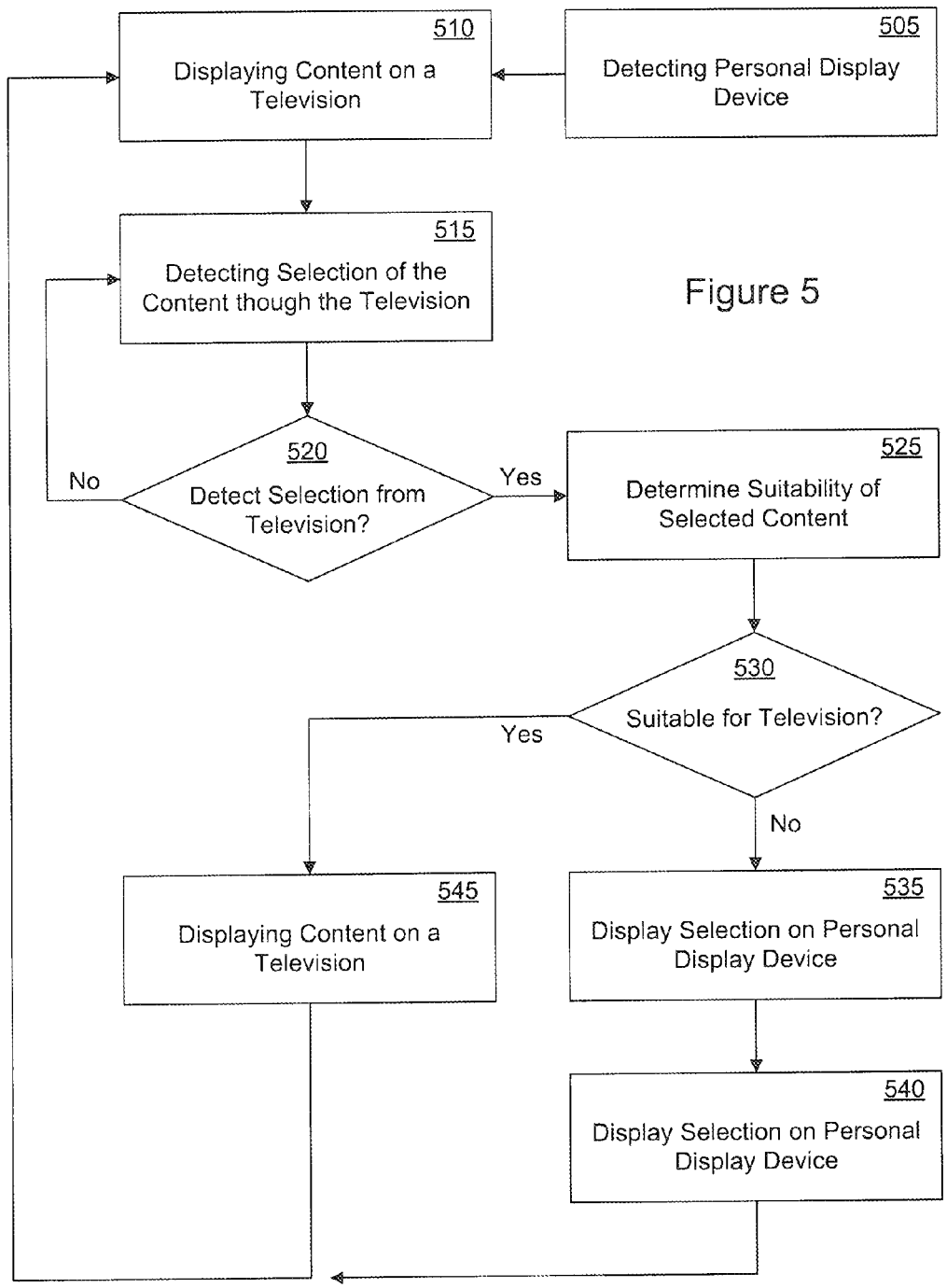
FIG. 5 illustrates processing operations associated with an embodiment of the invention.

FIG. 5 illustrates a flow diagram showing exemplary embodiments for using the streaming environment 110 and the platform server 120. The blocks within the flow diagram are shown only for illustrative purposes. For example, blocks within the flow diagram can be further divided, combined or performed in a different order without limiting the scope of the claims.

Initially, content is displayed 510. For example, selected content may be displayed through a client device 150 and a personal display device 175. In Block 505, a personal display device 175 is detected. In one embodiment, the personal display device 175 is detected within a physical proximity to the client device 150. The physical proximity can be set based on the local environment of the client device 150.

In Block 510, the display device 140 (e.g., the television) displays content through the client device 150. In one embodiment, the content displayed on the display device 140 includes streaming video, an image and a textual representation.

In Block 515, selection of the content displayed on the display device 140 is detected. If the selection of the content displayed on the display device 140 is detected in Block 520, then a determination is made on how to display the selected content. For example, the selected content is analyzed for suitability for utilization on the display device 140 and the personal display device 175. In one instance, selected content containing long textual passages such as a review on video content would be better suited for utilization on the personal display device 175 instead of the display device, because reading text is easier on the personal display device 175 instead of the display device. Conversely, the selected content containing video clips are more suited for display on the display device 140.

In another embodiment, if the selected content includes both a textual component and a video component, the textual component would be more suited for display on the personal display device 175, and the video component would be more suited for display on the display device 140. In this embodiment, the textual component could be displayed on multiple personal display devices.

In Block 530, if the selected content is more suitable for display on the display device 140, then the content is displayed on the display device 140 within Block 545.

If the selected content is more suitable for display on the personal display device 175, then the content is displayed on the personal display device 175 within Block 535. In one embodiment, portions of the selected content can be displayed on both the display device 140 and the personal display device 175.

In Block 540, a visual indictor is displayed indicating that the selected content is being displayed on the personal display device 175. The visual indicator is graphically displayed on the display device 140. In one embodiment, the visual indicator is a flashing screen. In another embodiment, the visual indicator is an icon. In yet another embodiment, the visual indicator is a change in color of the display.

Figure 6:
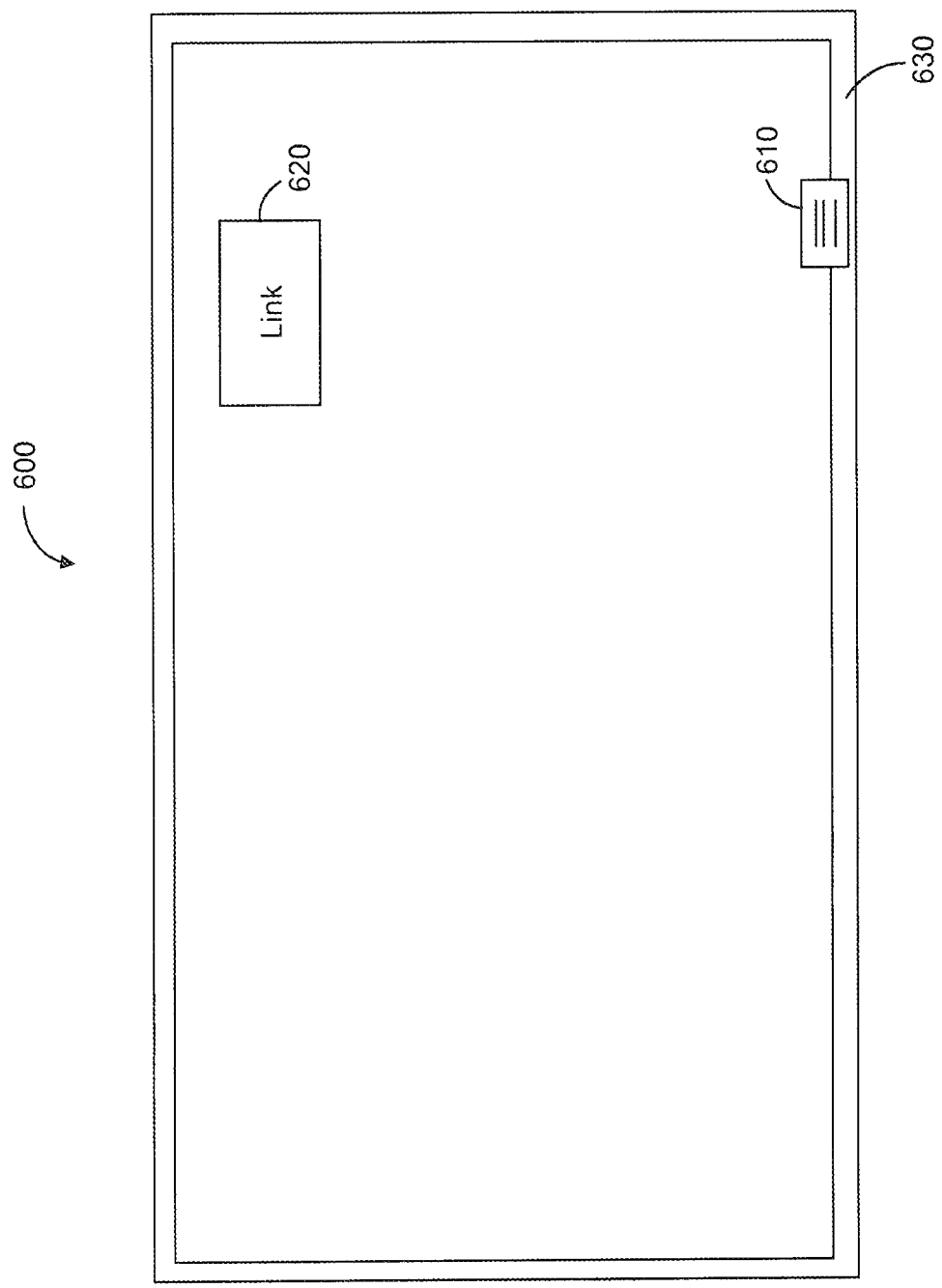
FIG. 6 is an exemplary screen shot according to one embodiment of the invention.

FIG. 6 illustrates a screen shot showing exemplary embodiments for use with the streaming environment 110 and the platform server 120. The representations within the screen shot are shown only for illustrative purposes. For example, contents within the screen shot may be omitted or added without limiting the scope of the claims.

FIG. 6 illustrates an exemplary screen shot 600 depicting a user interface for displaying content on the display device 140 and the personal display device 175. In one embodiment, the screen shot 600 is an exemplary screen a shown on the display device 140. The screen shot 600 includes an icon 610, a link to content 620 and a frame 630.

In one embodiment, the icon 610 represents an indication on the display device 140 that content is currently being displayed on the personal display device 175. In one embodiment, the icon 610 is only present when corresponding content is being displayed on the personal display device 175. In another embodiment, the icon 610 flashes or changes colors when corresponding content is being displayed on the personal display device 175.

In one embodiment, the link 620 represents the content that is currently being displayed on the personal display device 175. In one embodiment, the link 620 flashes or changes colors when corresponding content is being displayed on the personal display device 175.

In one embodiment, a change in color or other visual indicated on the frame 630 represents an indication on the display device 140 that content is currently being displayed on the personal display device 175.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A method, comprising:
receiving a selection of content from a personal display device operated by a user;
detecting, based on the receiving, the selection of content to be displayed by either the personal display device or a television;
analyzing the selection to identify a component of associated content;
determining whether the component is suitable for display on the television or the personal display device; and
causing the component of associated content to be displayed on the personal display device or the television based on the determining.

2. The method of claim 1, wherein the component is at least a portion of the associated content.

3. The method of claim 1, wherein whether the component is suitable for display on the television or the personal display device is based on a content type of the component, and wherein the content type includes at least one of a music content type, a video content type, a still pictures content type, a textual content type, or a gaming application content type.

4. The method of claim 1, wherein the component having the video content type is determined to be suitable for display on the television.

5. The method of claim 1, wherein the component having the textual content type is determined to be suitable for display on the personal display device.

6. The method of claim 1, wherein the determining is based on whether the user has access to the component of associated content.

7. The method of claim 6, further comprising:
determining whether a user profile of the user includes content payment information indicating that the user has access to the component of associated content.

8. The method of claim 7, further comprising:
enabling the user to access the component of associated content upon determining that the user profile includes the content payment information.

9. The method of claim 1, further comprising:
detecting an instruction associated with the selection received from the personal display device; and
determining the component of associated content is suitable for display on the television based on the detected instruction.

10. A method, comprising:
selecting, by a personal display device, a selection of content from content displayed on a screen of the personal display device;
sending, by the personal display device, the selection of content to a client device that:
 analyzes the selection to identify a component of associated content,
 determines whether the component is suitable for display on a television or the personal display device, and
 causes the component to be displayed by the television when the component is determined to be suitable for display on the television;
receiving, by the personal display device, the component when the component is determined to be suitable for display on the personal display device; and
displaying, by the personal display device, the received component of associated content.

11. The method of claim 10, further comprising:
retrieving the component of associated content from the client device or the Internet.

12. The method of claim 10, wherein the component is at least a portion of the associated content.

13. The method of claim 10, wherein whether the component is suitable for display on the television or the personal display device is based on a content type of the component, and wherein the content type includes at least one of a music content type, a video content type, a still pictures content type, a textual content type, or a gaming application content type.

14. The method of claim 10, wherein the component having the textual content type is determined to be suitable for display on the personal display device.

15. The method of claim 10, wherein the client device further determines whether the component is suitable for display on the television or the personal display device based on whether the user has access to the component.

16. The method of claim 10, wherein the sending comprises:
sending an instruction associated with the selection of content that indicates the component is suitable for display on either the television or the personal display device.

17. A system, comprising:
a memory; and
a processor coupled to the memory and configured to:
 receive a selection of content from a personal display device operated by a user;
 detect, based on the receiving, the selection of content to be displayed by either the personal display device or a television;
 analyze the selection to identify a component of associated content;
 determine whether the component is suitable for display on the television or the personal display device; and
 cause the component of associated content to be displayed on the personal display device or the television based on the determining.

18. The system of claim 17, wherein whether the component is suitable for display on the television or the personal display device is based on a content type of the component, and wherein the content type includes at least one of a music content type, a video content type, a still pictures content type, a textual content type, or a gaming application content type.

19. The system of claim 17, wherein the component is at least a portion of the associated content.

20. The system of claim 17, wherein the component having the video content type is determined to be suitable for display on the television.

21. The system of claim 17, wherein the determine is based on whether the user has access to the component of associated content.

* * * * *